(12) United States Patent
Park et al.

(10) Patent No.: US 7,646,942 B2
(45) Date of Patent: Jan. 12, 2010

(54) SILICON SEMICONDUCTOR BASED HIGH-SPEED RING OPTICAL MODULATOR

(75) Inventors: Jeong Woo Park, Daejeon (KR); Gyungock Kim, Seoul (KR); Hyun Soo Kim, Daejeon (KR); Bongki Mheen, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 11/833,004

(22) Filed: Aug. 2, 2007

(65) Prior Publication Data

US 2008/0080803 A1  Apr. 3, 2008

(30) Foreign Application Priority Data

Sep. 29, 2006  (KR) .................. 10-2006-0096455

(51) Int. Cl.
  *G02F 1/035*  (2006.01)
  *G02B 6/26*  (2006.01)
(52) U.S. Cl. ............................. 385/2; 385/32
(58) Field of Classification Search .......... 385/2, 385/32
  See application file for complete search history.

(56) References Cited

U.S. PATENT DOCUMENTS

| | | | |
|---|---|---|---|
| 4,997,246 A * | 3/1991 | May et al. ................ | 385/2 |
| 6,845,198 B2 | 1/2005 | Montgomery et al. | |
| 7,251,408 B1 * | 7/2007 | Gunn et al. ............... | 385/132 |
| 7,471,855 B2 * | 12/2008 | Chen et al. ............... | 385/14 |
| 2003/0068131 A1 | 4/2003 | Gunn, III | |
| 2006/0215949 A1 * | 9/2006 | Lipson et al. ............ | 385/2 |

FOREIGN PATENT DOCUMENTS

| | | |
|---|---|---|
| EP | 0 433 552 | 6/1991 |
| EP | 0433552 | 6/1991 |
| KR | 1020060092348 | 8/2006 |

OTHER PUBLICATIONS

Carlos Angulo Barrios et al; "Low-Power-Consumption Short-Length and High-Modulation-Depth Silicon Electrooptic Modulator"; Journal of Lightwave Technology, vol. 21, No. 4, Apr. 2003.
Ansheng Liu et al; "A high-speed silicon optical modulator based on a metal-oxide-semiconductor capacitor"; Nature, vol. 427, Feb. 12, 2004.
KIPO Notice of Patent Grant dated Mar. 31, 2008 for the corresponding application KR 10-2006-0096455.

* cited by examiner

*Primary Examiner*—Uyen-Chau N Le
*Assistant Examiner*—John M Bedtelyon
(74) *Attorney, Agent, or Firm*—Ladas & Parry LLP

(57) ABSTRACT

Provided is a high-speed ring optical modulator based on a silicon semiconductor, having increased optical modulation speed. The high-speed ring optical modulator includes a ring optical waveguide including a portion in which the refractive index varies, that is, a refractive index variation portion, and an optical waveguide having a constant refractive index. The refractive index variation portion comprises a bipolar transistor. Thus carriers can be supplied to and discharged from the refractive index variation portion, through which light is transmitted, at high speed, and thus the optical modulation speed can be increased.

18 Claims, 4 Drawing Sheets

SILICON SEMICONDUCTOR BASED HIGH-SPEED RING OPTICAL MODULATOR

CROSS-REFERENCE TO RELATED PATENT APPLICATION

This application claims the benefit of Korean Patent Application No. 10-2006-0096455, filed on Sep. 29, 2006 in the Korean Intellectual Property Office, the disclosure of which is incorporated herein in its entirety by reference.

BACKGROUND OF THE INVENTION

1. Field of the Invention

The present invention relates to a silicon semiconductor-based optical device, and more particularly, to a silicon semiconductor-based optical device including an optical waveguide having refractive index variation.

2. Description of the Related Art

Due to the rapid development in silicon semiconductor technology, the speed of semiconductor chips such as computer CPUs, DRAMs, and SRAMs is increasing. However, despite this, the signal communication speed between semiconductor chips has not increased accordingly. In order to address this problem, semiconductor chip communication using light has been suggested.

First, connecting semiconductor chips using optical devices formed of compound semiconductors has been studied worldwide. However, high-speed compound semiconductor optical devices are still relatively expensive, and packaging of the compound semiconductor optical devices and silicon semiconductor chips is complex and expensive. To address these problems, silicon optical devices are integrated with silicon semiconductor chips. Hereinafter, an optical modulator will be described as an example of an optical device.

A silicon optical modulator can be formed using various methods. One of the methods is using the resonance/anti-resonance of a Fabry-Perot cavity. This method is described in detail in "Low-Power Consumption Short-Length and High-Modulation-Depth Silicon Electrooptic Modulator," Journal of Lightwave Technology, Vol. 21, No. 4, pp. 1089-1098, 2003. In this method, the amount of light transmitted between two mirrors of the Fabry-Perot cavity is controlled by adjusting the amount of a current that is applied to a material, for example, silicon. However, in this method, light is reflected at an input end, and thus a portion of the light returns along the path the light came, and the returning light affects the optical communication, thereby adversely affecting communication.

Thus, an optical modulator using a ring resonator has been suggested to address the problem of reflection.

FIG. 1 is a schematic view illustrating a conventional optical modulator using a ring resonator. Hereinafter, the optical modulator using a ring resonator illustrated in FIG. 1 will be referred to as a ring optical modulator. Briefly, the ring optical modulator functions as follows. Input light $P_{in}$ input to a direct waveguide 10 is transmitted through the direct optical waveguide 10 and a portion of the input light $P_{in}$ is coupled to a ring optical waveguide 20. The light coupled to the ring optical waveguide 20 circulates through the ring optical waveguide 20 and is coupled to the direct optical waveguide 10 to generate interference with the input light $P_{in}$ which is being continuously input. The interference is constructive or destructive depending on the wavelength of the input light $P_{in}$.

FIG. 2 is a graph illustrating the transmittance characteristic of light when a current is supplied to the ring optical waveguide 20 of the ring optical modulator of FIG. 1 and when a current is not supplied.

Referring to FIG. 2, the transmittance characteristic of light according to the wavelength of the ring optical modulator varies when the refractive index of the ring optical waveguide 20 is varied. Typically, the ring optical waveguide 20 is formed of silicon, and one of the ways to vary the refractive index of silicon is by supplying a current to the silicon. When the current is supplied to the ring optical waveguide 20, the refractive index of the ring optical waveguide 20 is varied, and the wavelength is varied to cause destructive or constructive interference. Accordingly, the input light $P_{in}$ which is input at a predetermined wavelength, is output as output light $P_{out}$ while the input light $P_{in}$ interferes constructively or destructively to the light transmitted to the ring optical waveguide 20 depending on whether a current is supplied to the ring optical waveguide 20 or not.

An optical modulator formed using the above-described characteristic is disclosed in "Micrometer-scale silicon electro-optic modulator" in Nature, vol. 435, 2005, pp. 325-327.

However, in the above-described optical modulator, a current is supplied to the ring optical waveguide using a P-I-N diode, and when a P-I-N diode is used, the modulation speed is limited due to the characteristics of the P-I-N diode.

FIG. 3 is a cross-sectional view illustrating a P-I-N diode used in a ring optical waveguide.

Referring to FIG. 3, the P-I-N diode is formed of an n-type doping region 40, a p-type doping region 50, and an intrinsic region 60. Propagated light A is mostly transmitted through the intrinsic region 60. When the distribution of carriers such as electrons or holes of the intrinsic region 60 is changed, the refractive index of material is varied, and thereby light is modulated in the ring optical modulator as described above. Here, carriers should be supplied and discharged at high speed in the intrinsic region 60, that is, the region through which light is transmitted, for high speed optical modulation; however, the P-I-N diode has a property of which the speed of supply and discharge of carriers is low in the intrinsic region 60.

In detail, from the perspective of supply of carriers, the volume of the intrinsic region 60 is large, and thus it takes a long time to supply carriers to the intrinsic region 60. Also, from the perspective of discharging the supplied carriers, in the P-I-N diode structure, an inverse bias should be applied to quickly discharge the carriers from the intrinsic region 60, and even when the carriers are discharged by applying an inverse bias, it takes a long time to discharge the carriers because the life time of the minority carriers in the intrinsic region 60 is long.

Accordingly, since the time for supply and discharge of the carriers is long, the variation of the refractive index of the ring optical waveguide is slow and thus the modulation speed of the optical modulator is also limited. Thus, the modulation speed of a ring optical modulator using a ring resonator having a P-I-N structure is not greater than 10 Gbps presently. Also, the current required for supplying and discharging carriers to and from an intrinsic region of the P-I-N structure is also considerably large.

SUMMARY OF THE INVENTION

The present invention provides a high-speed ring optical modulator based on a silicon semiconductor having a high optical modulation speed by a small current provided to a base of bipolar transistor.

According to an aspect of the present invention, there is provided a high-speed ring optical modulator based on a silicon semiconductor, the ring optical modulator comprising: a ring optical waveguide in which a refractive index variation portion is formed, wherein the refractive index variation portion is formed using a bipolar transistor structure.

The effective refractive index variation $\Delta n_{eff}$ of the refractive index variation portion may be represented as $\lceil \times \Delta n$, where $\lceil$ is a confinement ratio and $\Delta n$ is refractive index variation, and a low doping region of a collector region of the bipolar transistor, that is, a sub-collector region, may be used in the refractive index variation portion. Carriers may be supplied to and discharged from the sub-collector region.

The confinement ratio $\lceil$ is defined as optical intensity of the refractive index variation portion with respect to the entire optical density of the ring optical waveguide, and the refractive index variation $\Delta n$ is characterized below when an input wavelength is 1.55 μm, $$\Delta n = -[8.8 \times 10^{-22} \times \Delta N + 8.5 \times 10^{-18} \times (\Delta P)^{0.8}],$$

where $\Delta N$ and $\Delta P$ are variations of densities of electrons and holes, respectively, in units of $cm^{-3}$.

A phase difference between light transmitted through the ring optical waveguide by the variation of the effective refractive index $\Delta n_{ef}$ and light transmitted through a direct ring optical waveguide may be π. While the phase difference is π, in order to reduce the capacitance of the refractive index variation portion, the length of the ring optical waveguide needs to be reduced and the $\Delta n_{eff}$ needs to be increased, and when $\lceil$ is increased, $\Delta n_{eff}$ can be increased.

The sub-collector region may be used in a transmitting portion of light to increase $\lceil$. $\Delta n_{eff}$ may be generated by a predetermined current flowing through the sub-collector region. The current flowing through the sub-collector region may be adjusted by adjusting the current supplied to a base of the bipolar transistor, and the current flowing through the sub-collector region is a product of the current gain β of the bipolar transistor and the current supplied to the base of the bipolar transistor.

The ring optical waveguide, in which the refractive index variation portion is formed, may be formed using a silicon-on-insulator (SOI) substrate. An insulator of the SOI substrate may be formed by selectively implanting oxygen ions to a silicon bulk substrate. A low doping region of a collector region of the bipolar transistor, that is, a sub-collector region, may be used in the refractive index variation portion.

The sub-collector region may be formed of a silicon semiconductor layer on the insulator of the SOI substrate. The ring optical waveguide in which the refractive index variation portion is formed may comprise a high-density doping layer, a low-density doping layer, and an oxide layer formed on a silicon substrate.

The high and low density doping layers may be n-type or p-type semiconductor layers which are doped with Group 3 or 5 elements, and the oxide layer may be a silicon oxide ($SiO_2$) layer which is doped with oxygen ions.

The high speed ring optical modulator according to the present invention uses a bipolar transistor in the variation portion of the refractive index, and thus carriers can be supplied and discharged at high speed, and the confinement ratio is improved to reduce the size of the optical device and high speed optical modulation is enabled also by supplying a small electric current.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
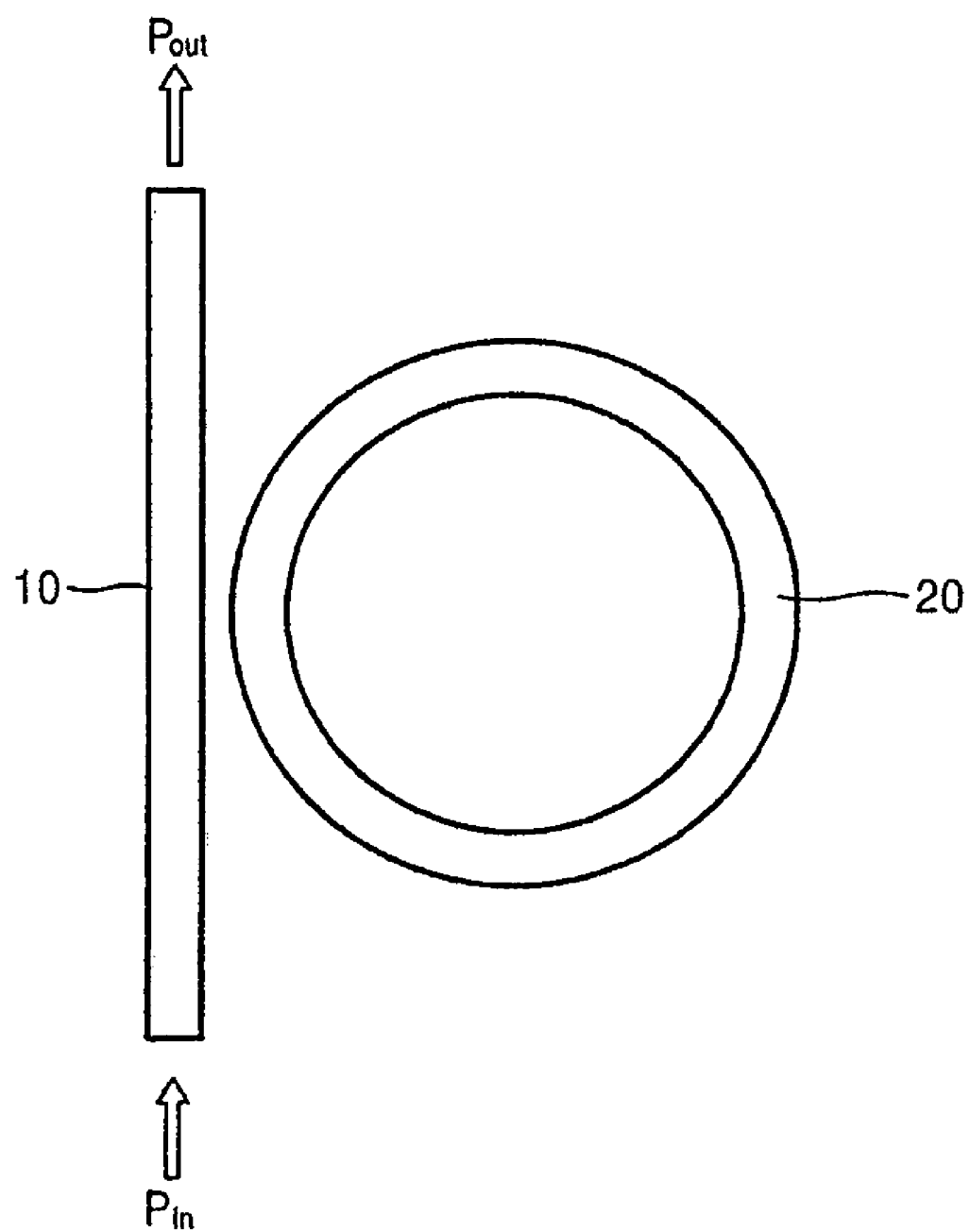
FIG. 1 is a schematic view of a conventional optical modulator using a ring resonator according to an embodiment of the present invention.
Figure 2:
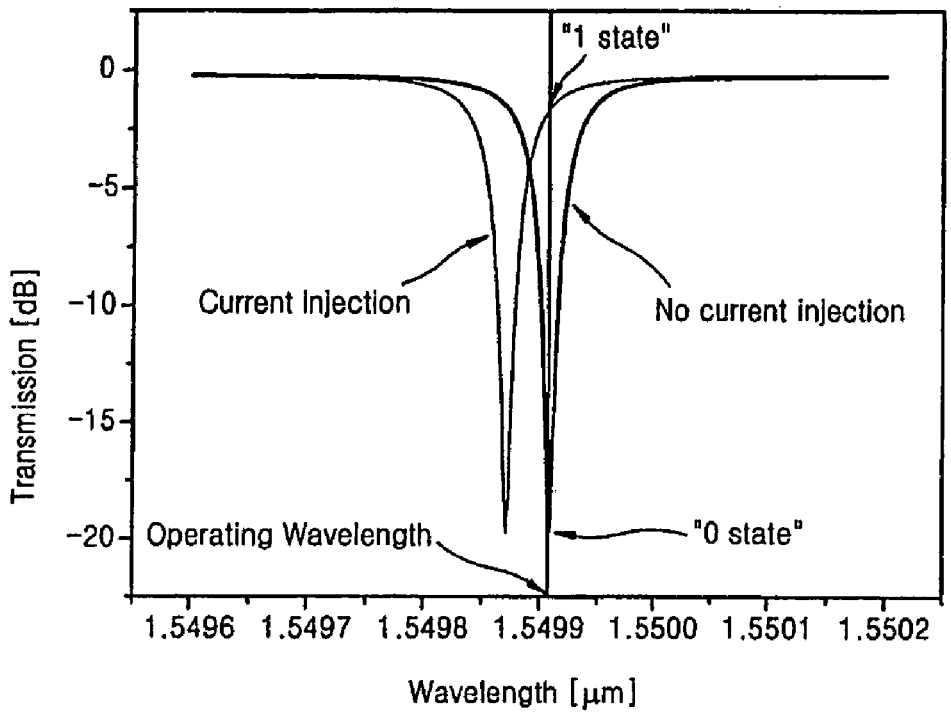
FIG. 2 is a graph illustrating the transmittance characteristic of light in the case when a current is supplied to a ring waveguide of the optical modulator of FIG. 1 and when a current is not supplied.
Figure 3:
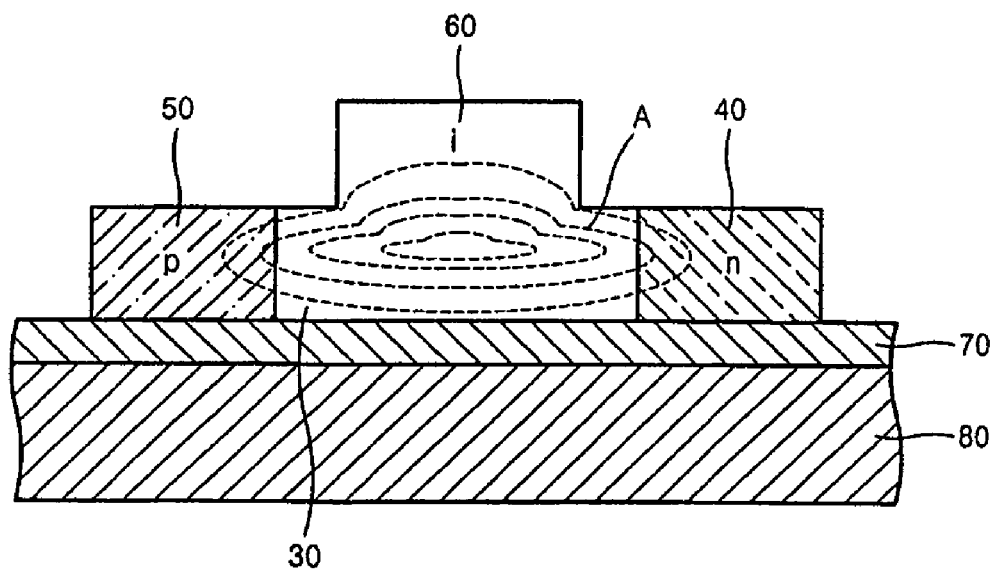
FIG. 3 is a cross-sectional view illustrating a P-I-N diode used in a ring waveguide.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. It will also be understood that when a layer is referred to as being "on" another layer or substrate, it can be directly on the other layer or substrate, or intervening layers may also be present. Like reference numerals in the drawings denote like elements. The terms used herein are for illustrative purpose of the present invention only and should not be construed to limit the meaning or the scope of the present invention as described in the claims.

The present invention provides an optical modulator using a ring resonator including a ring waveguide formed using a bipolar transistor to increase the modulation speed. First of all, the relationship between the variation of the refractive index and the confinement ratio will be described.

The variation of refractive index $\Delta n$ is usually decided by an input wavelength and the amount of carriers in the waveguide. Equation (1) below represents the variation of the refractive index $\Delta n$ when the input wavelength is 1.55 μm.

$$\Delta n = -[8.8 \times 10^{-22} * \Delta N + 8.5 \times 10^{-18} * (\Delta P)^{0.8}] \quad \text{Equation (1)}$$

where $\Delta N$ and $\Delta P$ are variations of densities of electrons and holes, respectively, in units of $cm^{-3}$. As can be seen from Equation (1), the greater the variation of the amount of electrons and holes, the greater the refractive index. The variation of the refractive index according to applied current is smaller in the case of a silicon semiconductor than in the case of a compound semiconductor. Thus, in a silicon semiconductor, there should be a large variation of current and a large area where the number of holes and electrons is being varied.

As a matter of fact, the confinement ratio $\lceil$ should be sufficient for light transmitted through the optical waveguide to generate large variation of the refractive index. The confinement ratio $\lceil$ is defined as the intensity of light having variation of the refractive index with respect to the intensity of the entire light. The substantial variation of effective refractive index of light is $\Delta n_{\textit{eff}} = \lceil \times \Delta n$.

Figure 4:
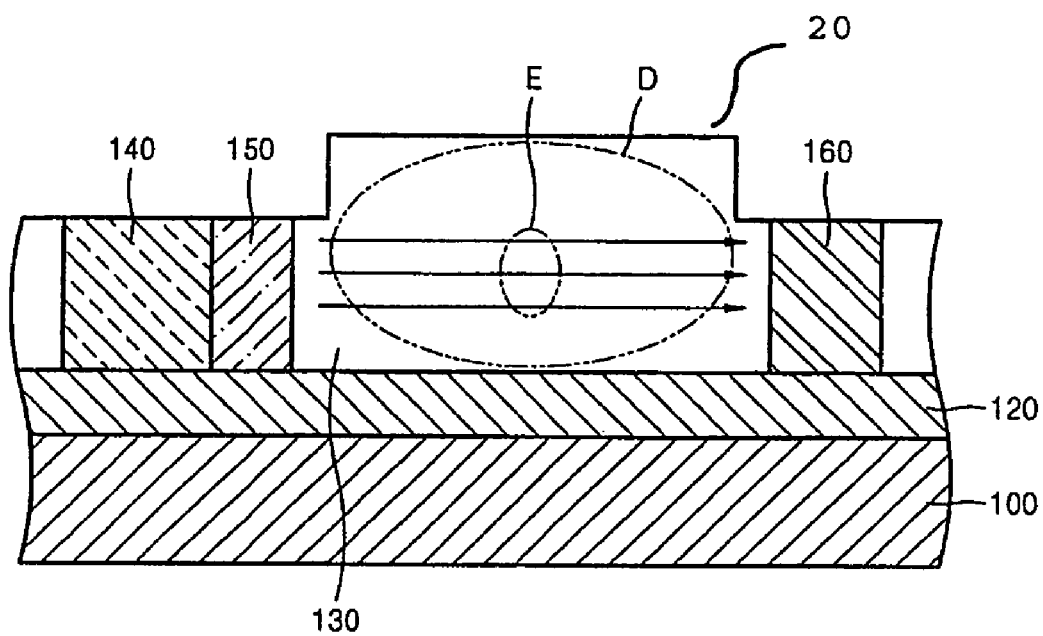
FIG. 4 is a cross-sectional view illustrating a bipolar transistor used in a ring optical modulator according to an embodiment of the present invention.

FIG. 4 is a cross-sectional view illustrating a bipolar transistor used in a ring optical modulator according to an embodiment of the present invention;

Referring to FIG. 4, the ring optical waveguide using a bipolar transistor includes a substrate 100, an insulating layer 120, and a semiconductor activation layer. The semiconductor activation layer includes an emitter region 140, a base region 150, a collector region 160, and a sub-collector region 130 through which light is transmitted.

According to the current embodiment of the present invention, the substrate 100 is formed of silicon, the insulating layer 120 is a silicon oxide layer, and the semiconductor activation layer is a silicon layer doped with carriers. The ring optical waveguide can be formed using a silicon-on-insulator (SOI) substrate structure, but is not limited thereto. The emitter region 140 of the semiconductor activation layer is a high-density n-type doping layer ($n^+$), the base region 150 is a p-type doping layer, and the collector region 160 is a high-density n-type doping layer ($n^+$). Thus, the bipolar transistor according to the current embodiment of the present invention is an n-p-n type bipolar transistor. The sub-collector region 130 through which light is transmitted is formed as a low-density n-type doping layer to increase the variation of carriers by applied current, thereby increasing the variation of the refractive index. Instead of the n-p-n type, a p-n-p type bipolar transistor can also be used.

When the bipolar transistor as described above is used as a ring optical waveguide, variation of the effective refractive index can be increased.

When the bipolar transistor is used in the ring optical waveguide as in the current embodiment of the present invention, regarding the supply of carriers, carriers can be injected to the base region 150 which has a small volume, and thus time for supplying carriers is short. With respect to discharging of carriers, when carriers are discharged from the sub-collector region 130 in the case of the bipolar transistor, minority carriers are not related, and thus carriers can be discharged at high speed without being affected by the lifetime of the minority carriers. Consequently, using the bipolar transistor, carriers can be supplied and discharged at high speed to and from the region through which light is transmitted, that is, the sub-collector region 130, and thus light can be modulated at high speed.

Also, by using the bipolar transistor as in the current embodiment of the present invention, it is easy to form a turn-on driver. That is, in the bipolar transistor, a large current swing is possible in the region through light is transmitted by a small current swing in the base region 150. In other words, when a current gain of the bipolar transistor is $\beta$, only $1/\beta$ of the current that flows through the region through which light is transmitted is needed to be supplied to the base region 150 in the turn-on driver using the bipolar transistor.

In general, in order to form a ring optical waveguide using a semiconductor, the refractive index of the region through which light is transmitted should be higher than the refractive index of the neighboring region. Light is transmitted through the region where the refractive index is higher than that of the neighboring region.

In detail, the refractive index in the region where the doping density is low is generally higher than the refractive index in the region where the doping density is high.

Figure 5A:
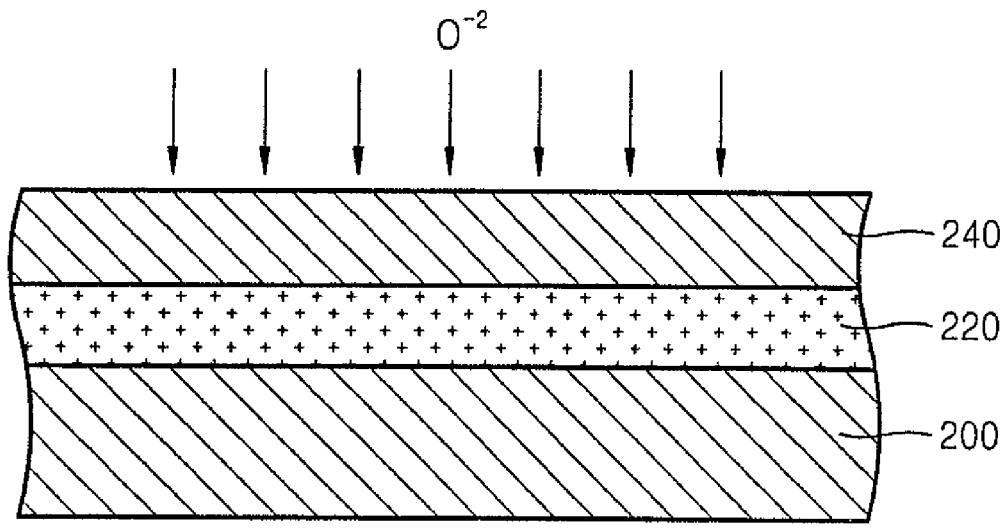
FIGS. 5A and 5B are cross-sectional views illustrating the structures of silicon semiconductor substrates that can be used for refractive index variation of a ring optical waveguide according to embodiments of the present invention.
Figure 5B:
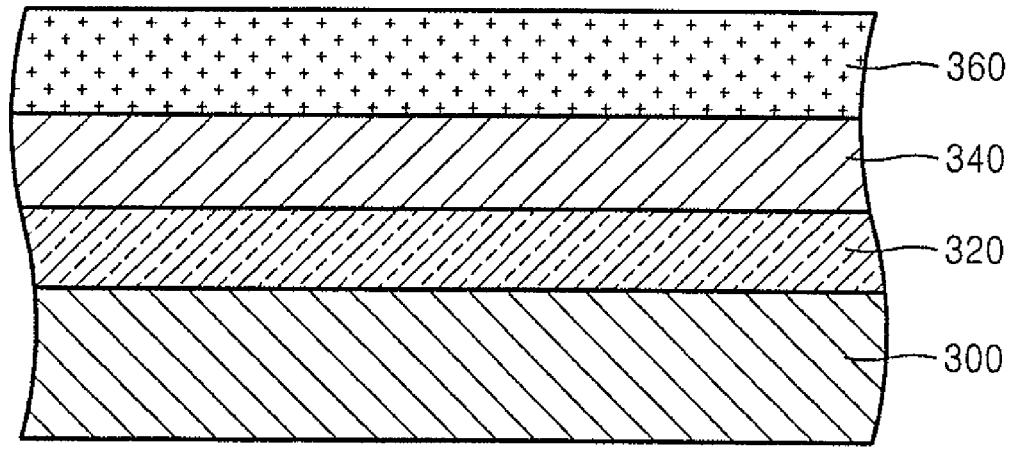

FIGS. 5A and 5B are cross-sectional views illustrating the structure of silicon semiconductor substrates that can be used for refractive index variation of a ring optical waveguide according to embodiments of the present invention.

Referring to FIG. 5A, a substrate for a ring optical waveguide is formed by selectively injecting oxygen ions ($O^{-2}$) to a silicon bulk substrate. Accordingly, the substrate for a ring optical waveguide is formed of a lower silicon layer 200, a silicon oxide layer 220, and an upper silicon layer 240. In general, the refractive index of silicon is about 3.5, and the refractive index of silicon oxide is about 1.7, and thus the upper silicon layer 240 functions as a waveguide. Since air has a refractive index of almost 1, no other material layer needs to be formed on the upper silicon layer 240. However, a silicon oxide layer may be formed on a surface of the upper silicon layer 240 according to requirements.

FIG. 5B illustrates another substrate for an optical waveguide. Referring to FIG. 5B, the substrate for an optical waveguide is formed of material layers having different refractive indices by selectively doping carrier ions and oxygen ions on a silicon bulk substrate. Accordingly, the substrate for a ring optical waveguide illustrated in FIG. 5B includes a silicon layer 300, a high-density doping layer 320, a low-density doping layer 340, and a silicon oxide layer 360. As described above, the lower the doping density, the higher the refractive index. Thus the low-density doping layer 340 functions as a waveguide. The high-density doping layer 320 and the low-density doping layer 340 are n-type or p-type semiconductor layers doped with Group 3 or 5 elements.

The silicon semiconductor substrates illustrated in FIGS. 5A and 5B can be used in an optical modulator, particularly in a ring optical waveguide. In particular, a bipolar transistor can be formed using the silicon semiconductor substrates of FIGS. 5A and 5B for a ring optical waveguide to increase variation of the effective refractive index, and accordingly, an optical modulator having several advantages as described above can be realized.

Although an optical modulator using a ring resonator, that is, a ring optical modulator has been described until now, the present invention is not limited to a ring optical modulator. That is, a bipolar transistor can be used not only in a ring optical modulator but also in a refractive index variation portion in an optical modulator formed using a semiconductor. Furthermore, a bipolar transistor can be used in all kinds of optical devices formed using a semiconductor in which refractive index can be varied by supplying a current to the bipolar transistor.

As described above, the high-speed ring optical modulator based on a silicon semiconductor according to the present invention uses a bipolar transistor structure in a refractive index variation portion, carriers can be supplied to and discharged from a region through which light is transmitted at high speed, and thus light can be modulated at high speed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A high-speed ring optical modulator based on a silicon semiconductor, the ring optical modulator comprising:

a ring optical waveguide in which a refractive index variation portion is formed; and an optical waveguide having a constant refractive index optically coupled to the ring optical waveguide, wherein the refractive index variation portion comprises a bipolar transistor, the bipolar transistor comprising an emitter region, a base region, a collector region, and a sub-collector region having a ridge structure and being disposed between the base region and the collector region, wherein the collector region has a high doping concentration and the sub-collector region has a low doping concentration, the low doping concentration being less than the high doping concentration.

2. The high-speed ring optical modulator of claim 1, wherein the effective refractive index variation $\Delta n_{eff}$ of the refractive index variation portion is represented as $\lceil \times \Delta n$,
   where $\lceil$ is a confinement ratio and $\Delta n$ is refractive index variation, and
   the refractive index variation portion comprises the sub-collector region, the sub-collector region having a ring shape.

3. The high-speed ring optical modulator of claim 2, wherein carriers are supplied to and discharged from the sub-collector region.

4. The high-speed ring optical modulator of claim 2, wherein $\Delta n_{eff}$ is generated by a predetermined current flowing through the sub-collector region.

5. The high-speed ring optical modulator of claim 4, wherein the current flowing through the sub-collector region is adjusted by adjusting the current supplied to the base region of the bipolar transistor, and
   the current flowing through the sub-collector region is a product of the current gain β of the bipolar transistor and the current supplied to the base region of the bipolar transistor.

6. The high-speed ring optical modulator of claim 1, wherein the ring optical waveguide, in which the refractive index variation portion is formed, comprises a silicon-on-insulator (SOI) substrate.

7. The high-speed ring optical modulator of claim 6, wherein an insulator of the SOI substrate is formed by selectively implanting oxygen ions to a silicon bulk substrate.

8. The high-speed ring optical modulator of claim 7, wherein the sub-collector region comprises a silicon semiconductor layer on the insulator of the SOI substrate.

9. The high-speed ring optical modulator of claim 1, wherein the ring optical waveguide in which the refractive index variation portion is formed comprises a high-density doping layer, a low-density doping layer, and an oxide layer formed on a silicon substrate,
   wherein the doping concentration of the high-density doping layer is greater than that of the low-density doping layer.

10. The high-speed ring optical modulator of claim 9, wherein the high and low density doping layers are n-type or p-type semiconductor layers which are doped with Group 3 or 5 elements, and the oxide layer is a silicon oxide ($SiO_2$) layer which is doped with oxygen ions.

11. A high-speed ring optical modulator based on a silicon semiconductor, the ring optical modulator comprising:

a ring optical waveguide in which a refractive index variation portion is formed; and an optical waveguide having a constant refractive index optically coupled to the ring optical waveguide, wherein the refractive index variation portion comprises a bipolar transistor, the bipolar transistor comprising an emitter region, a base region, a collector region, and a sub-collector region having a ridge structure and being disposed between the base region and the collector regions, wherein the effective refractive index variation $\Delta n_{eff}$ of the refractive index variation portion is represented as $\lceil \times \Delta n$,
   where $\lceil$ is a confinement ratio and $\Delta n$ is refractive index variation, and
   the refractive index variation portion comprises the sub-collector region, wherein the collector region has a high doping concentration and the sub-collector region has a low doping concentration, the low doping concentration being less than the high doping concentration.

12. The high-speed ring optical modulator of claim 11, wherein carriers are supplied to and discharged from the sub-collector region.

13. The high-speed ring optical modulator of claim 11, wherein $\Delta n_{eff}$ is generated by a predetermined current flowing through the sub-collector region.

14. The high-speed ring optical modulator of claim 13, wherein the current flowing through the sub-collector region is adjusted by adjusting the current supplied to the base region of the bipolar transistor, and
   the current flowing through the sub-collector region is a product of the current gain β of the bipolar transistor and the current supplied to the base region of the bipolar transistor.

15. The high-speed ring optical modulator of claim 11, wherein the ring optical waveguide, in which the refractive index variation portion is formed, comprises a silicon-on-insulator (SOI) substrate.

16. The high-speed ring optical modulator of claim 15, wherein an insulator of the SOI substrate is formed by selectively implanting oxygen ions to a silicon bulk substrate.

17. The high-speed ring optical modulator of claim 16, wherein the sub-collector region comprises a silicon semiconductor layer on the insulator of the SOI substrate.

18. The high-speed ring optical modulator of claim 11, wherein the ring optical waveguide in which the refractive index variation portion is formed comprises a high-density doping layer, a low-density doping layer, and an oxide layer formed on a silicon substrate,
   wherein the doping concentration of the high-density doping layer is greater than that of the low-density doping layer.

* * * * *